United States Patent
Han

(10) Patent No.: US 10,204,381 B2
(45) Date of Patent: Feb. 12, 2019

(54) RECIPROCAL DISTRIBUTION CALCULATING METHOD AND RECIPROCAL DISTRIBUTION CALCULATING SYSTEM FOR COST ACCOUNTING

(71) Applicant: CalebABC CO., LTD., Seoul (KR)

(72) Inventor: Yun Han, Seoul (KR)

(73) Assignee: CALEBABC CO., LTD., Seoul (KR)

( * ) Notice: Subject to any disclaimer, the term of this patent is extended or adjusted under 35 U.S.C. 154(b) by 417 days.

(21) Appl. No.: 14/763,165

(22) PCT Filed: Jan. 23, 2014

(86) PCT No.: PCT/KR2014/000662
§ 371 (c)(1),
(2) Date: Jul. 24, 2015

(87) PCT Pub. No.: WO2014/119872
PCT Pub. Date: Aug. 7, 2015

(65) Prior Publication Data
US 2015/0363891 A1    Dec. 17, 2015

(30) Foreign Application Priority Data

Jan. 31, 2013   (KR) .................. 10-2013-0011372

(51) Int. Cl.
*G06Q 40/00*   (2012.01)
*G06Q 30/02*   (2012.01)
*G06Q 10/08*   (2012.01)

(52) U.S. Cl.
CPC ......... *G06Q 40/12* (2013.12); *G06Q 30/0206* (2013.01); *G06Q 40/00* (2013.01)

(58) Field of Classification Search
USPC ........................................... 705/30
See application file for complete search history.

(56) References Cited

U.S. PATENT DOCUMENTS

| 2013/0060712 A1* | 3/2013 | Esmaili | G06Q 10/08 705/341 |
| 2013/0132804 A1* | 5/2013 | Frayer | G06F 11/1012 714/780 |

FOREIGN PATENT DOCUMENTS

| JP | H07-220000 | 8/1995 |
| JP | 2002-169952 | 6/2002 |

(Continued)

OTHER PUBLICATIONS

"International Search Report (Form PCT/ISA/210)", dated Feb. 24, 2014, with English translation thereof, pp. 1-4, in which the listed references were cited.

*Primary Examiner* — Garcia Ade
(74) *Attorney, Agent, or Firm* — JCIPRNET

(57) ABSTRACT

Provided are a reciprocal distribution calculating method and a reciprocal distribution calculating system for cost accounting, in which, when performing cost accounting using a computer, a reciprocal distribution method is used to effectively perform cost accounting of each department. In the reciprocal distribution calculating method and the reciprocal distribution calculating system for cost accounting, reciprocal distribution costs are calculated using the limit and convergence of a transition probability matrix. And, a reciprocal distribution calculation is performed in a completely different way from the method of calculating reciprocal distribution known for the last several tens of years and in an effective manner, thereby calculation of reciprocal distribution costs at a high speed.

3 Claims, 2 Drawing Sheets

(56) References Cited

FOREIGN PATENT DOCUMENTS

| JP | 2002-297701 | 10/2002 |
| JP | 2003-337883 | 11/2003 |
| JP | 2004-038682 | 2/2004 |
| JP | 2006-331060 | 12/2006 |
| JP | 2010-282524 | 12/2010 |

* cited by examiner

RECIPROCAL DISTRIBUTION CALCULATING METHOD AND RECIPROCAL DISTRIBUTION CALCULATING SYSTEM FOR COST ACCOUNTING

CROSS-REFERENCE TO RELATED APPLICATION

This application is a 371 application of international PCT application serial no. PCT/KR2014/000662, filed on Jan. 23, 2014, which claims the priority benefit of Korea application no. KR 10-2013-0011372, filed on Jan. 31, 2013. The entirety of each of the abovementioned patent applications is hereby incorporated by reference herein and made a part of this specification.

TECHNICAL FIELD

The inventive concept relates to a reciprocal distribution calculating method and a reciprocal distribution calculating system for cost accounting, and more particularly, to a reciprocal distribution calculating method and a reciprocal distribution calculating system for cost accounting, in which, when performing cost accounting using a computer, a reciprocal distribution method is used to effectively perform cost accounting of each department.

BACKGROUND ART

In regard to calculating of costs of an enterprise, a cost allocation process whereby costs incurred in respective cost departments (subsidiary departments and production departments) are distributed between respective departments is important. Examples of known cost allocation methods are a direct distribution method, a step distribution method, and a reciprocal distribution method.

The reciprocal distribution method, in which costs are distributed by considering services reciprocated between departments, increases accuracy of cost allocation and cost accounting and provides information about support costs of a service-providing department, thus providing important information regarding decision making for enterprise management.

However, calculation of cost allocation according to the reciprocal distribution method involves continuous reciprocating services between cost departments, and thus the calculation of costs is complicated. In particular, when calculating costs of a company having a large number of departments using a computer, an operation memory of a very large capacity is required, and it takes a long time to calculate the final costs. Accordingly, a cost accounting system according to the reciprocal distribution method requires a very expensive high-performance computer.

Due to the above problem, although cost accounting according to the reciprocal distribution method provides important and various information related to enterprise management, a function of a module corresponding to cost accounting according to the reciprocal distribution method is restricted in many ERP (Enterprise Resource Planning) systems that are on the market. Also, since cost accounting according to the reciprocal distribution method requires a high-performance computer system, costs consumed in the cost accounting according to the reciprocal distribution method are high.

SUMMARY

Technical Problem

The inventive concept provides a reciprocal distribution calculating method and a reciprocal distribution calculating system for cost accounting, in which calculation of reciprocal distribution costs may be performed easily and fast.

Technical Solution

According to a reciprocal distribution calculating method and a reciprocal distribution calculating system for cost accounting according to the inventive concept, reciprocal distribution costs are calculated using the limit and convergence of a transition probability matrix.

Advantageous Effects

According to the reciprocal distribution calculating method and the reciprocal distribution calculating system for cost accounting according to the inventive concept, reciprocal distribution calculation is performed in a completely different way from the method of calculating reciprocal distribution known for the last several tens of years and in an effective manner, thereby enabling calculation of reciprocal distribution costs at a high speed.

In addition, as reciprocal distribution costs may be calculated in an easy way according to the reciprocal distribution calculating method and the reciprocal distribution calculating system for cost accounting according to the inventive concept, compared to the conventional method, reciprocal distribution costs may be calculated fast and effectively while using a computer with relatively low specifications.

EMBODIMENTS OF THE INVENTION

Figure 1:
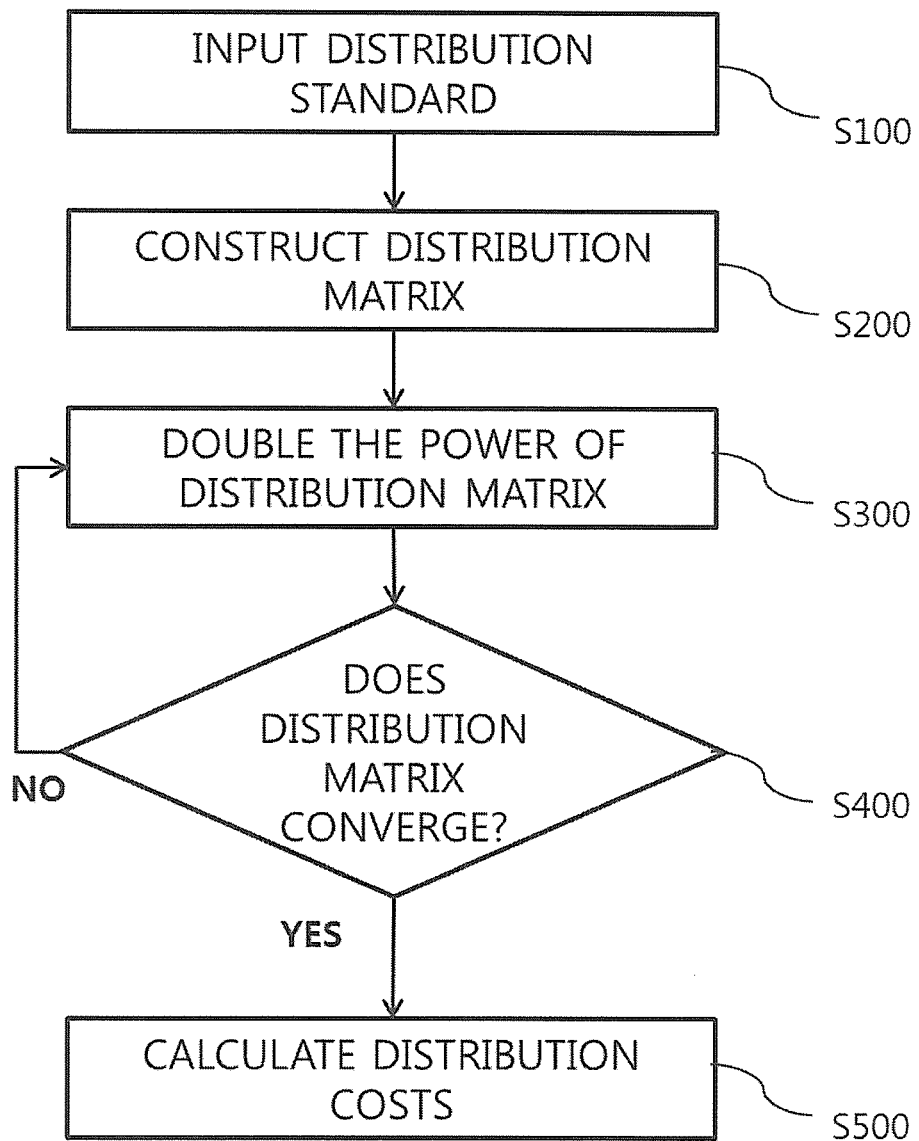
FIG. 1 is a flowchart of a reciprocal distribution calculating method for cost accounting according to an exemplary embodiment of the inventive concept.
Figure 2:
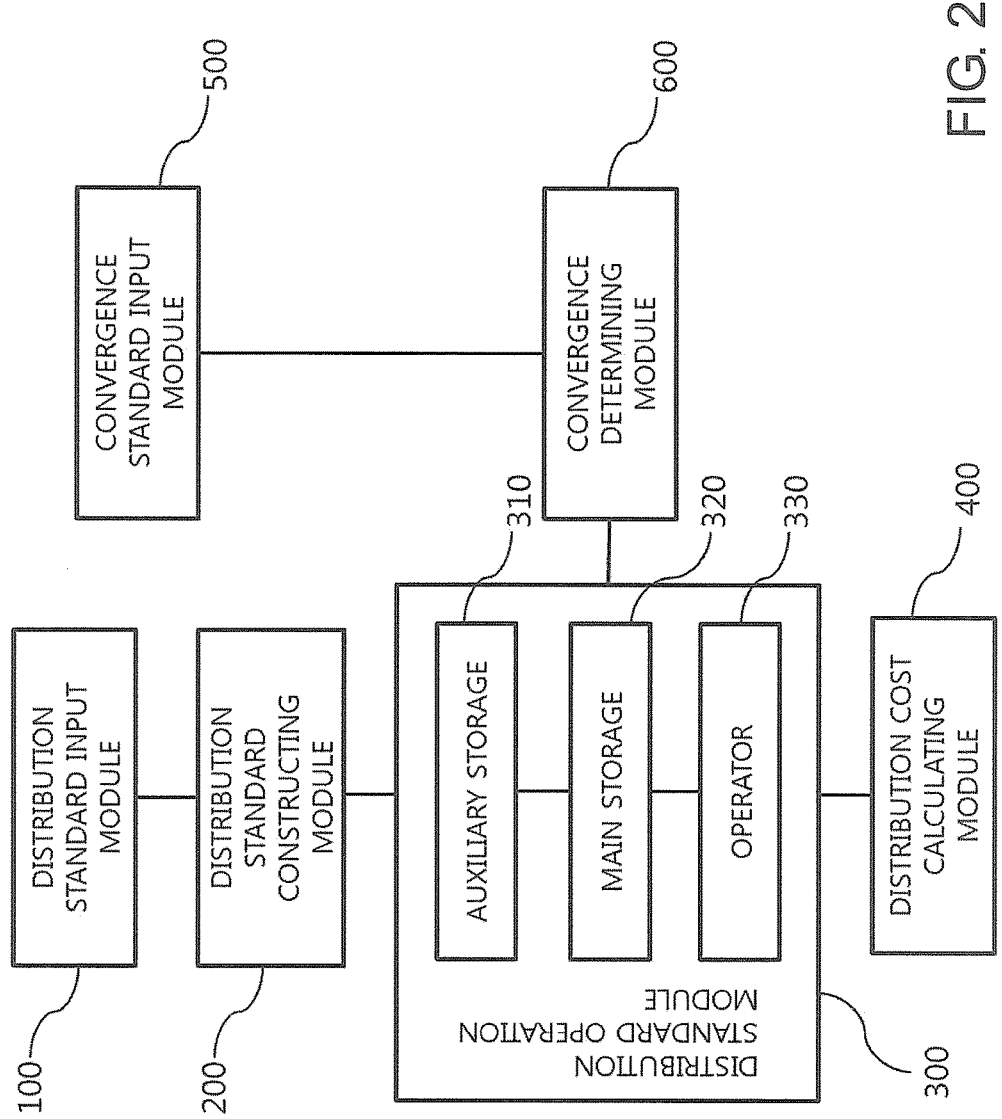
FIG. 2 is a block diagram illustrating a reciprocal distribution calculating system for cost accounting according to an exemplary embodiment of the inventive concept.

Hereinafter, a reciprocal distribution calculating method for cost accounting according to the inventive concept will be described in detail.

First, a distribution standard representing distribution ratios between respective cost departments consisting of subsidiary departments and production departments is received (step (a); S100).

A production department refers to a department that produces final goods such as products or services. The production department indicates not only a production field of manufacturing industry but also a final service-providing department of a service business. In the case of a hospital, for example, medical treatment departments which are in charge of giving direct medical treatment to patients, such as a department of internal medicine or a department of surgery, correspond to the production departments. A subsidiary department corresponds to a supporting department providing services to the production department. Subsidiary departments may provide services to one another and to each divisions of the production department. Examples of the subsidiary department are a human resource department, a legal department, a social contribution department, and a public service department. Both the subsidiary departments and the production departments are referred to below as cost departments. A cost department refers to a unit department which is a basis for cost accounting.

Hereinafter, description will be based a company consisting of three subsidiary departments s1, s2, and s3 and two production departments a1 and a2 as an example. A real enterprise usually consists of several tens to hundreds of cost departments.

A distribution standard for cost allocation between cost departments as described above is received via a distribution standard input module 100 (step (a); S100). An input device of a computer may be used as the distribution standard input module 100.

The distribution standard according to the present exemplary embodiment may be represented by expressions as below.

$$s1 = 0.4 \times s2 + 0.2 \times s3 + 0.2 \times a1 + 0.2 \times a2$$

$$s2 = 0.1 \times s1 + 0.3 \times s3 + 0.2 \times a1 + 0.4 \times a2$$

$$s3 = 0.2 \times s1 + 0.2 \times s2 + 0.2 \times a1 + 0.4 \times a2$$

$$a1 = 1.0 \times a1$$

$$a2 = 1.0 \times a2$$

Referring to the expressions above, 40% of services of department s1 is provided to department s2; 20% of the services of department s1 is provided to department s3; 20% of the services of department s1 is provided to department s3; 20% of the services of department s1 is provided to department a1; and 20% of the services of department s1 is provided to department a2.

A distribution matrix which may represent a distribution relation between the respective cost departments, by using Equation 1, is constructed based on the distribution standard received in step (a) as described above (step (b); S200).

A distribution matrix constructing module 200 that has received the distribution standard from the distribution standard input module 100 constructs a distribution matrix.

$$x[k+1] = Ax[k] \quad \text{[Equation 1]}$$

$x_i$: ith cost department n: the number of cost departments $A = [a_{ij}]_{n \times n}$: ratio of a service of jth cost department, provided to the ith cost department x[k]: costs of cost departments redistributed by k times In Equation 1 above, a vector matrix x of a cost department is constructed as below in the present exemplary embodiment.

$$x = \begin{bmatrix} s1 \\ s2 \\ s3 \\ a1 \\ a2 \end{bmatrix}$$

The distribution matrix based on the distribution standard received in step (a) is as below in the present exemplary embodiment.

$$A = \begin{bmatrix} 0 & 0.1 & 0.2 & 0 & 0 \\ 0.4 & 0 & 0.2 & 0 & 0 \\ 0.2 & 0.3 & 0 & 0 & 0 \\ 0.2 & 0.2 & 0.2 & 1 & 0 \\ 0.2 & 0.4 & 0.4 & 0 & 1 \end{bmatrix}$$

The distribution matrix is constructed by the distribution matrix constructing module 200.

According to the distribution matrix above, resources of each division in a kth step are multiplied by the distribution matrix according to Equation 1 and distributed as resources of each division in a (k+1)th step. Due to characteristics of reciprocal distribution, departments reciprocate services between one another, and thus, even if a distribution process is repeated several times, costs of the subsidiary department are not completely distributed to the production departments but remain in other subsidiary department or the subsidiary departments receive a cost amount from other subsidiary department.

First, a method of calculating reciprocal distribution costs according to the conventional art by using Equation 1 above will be described.

For example, when costs of the subsidiary departments s1, s2, and s3 are respectively $200,000, $300,000, and $400,000, and these amounts are set as an initial value x[0] and an amount distributed in a first distribution step is calculated based on Equation 1 above, the amount is as below.

$$x[1] = \begin{bmatrix} 110{,}000 \\ 160{,}000 \\ 130{,}000 \\ 180{,}000 \\ 320{,}000 \end{bmatrix}$$

By repeating the above calculation until the costs of the subsidiary departments are completely distributed to the production departments, an amount as below was obtained in the 23th distribution step. Calculation of distribution was repeated until the costs of the subsidiary departments had a value less than 0.01. As a result, the calculation of distribution was performed twenty-three times.

$$x[23] = \begin{bmatrix} 0.00 \\ 0.00 \\ 0.00 \\ 325{,}961.54 \\ 574{,}038.46 \end{bmatrix}$$

A result of the calculation shows that a cost distributed to the production department a1 was $325,961.54, and a cost distributed to the production department a2 was $574,038.46. According to the conventional art, the distribution expression was repeatedly calculated many times until the costs of the subsidiary departments are completely distributed (until the costs of the subsidiary departments converge to 0). As the number of cost departments increases, the number of times of calculating the distribution expression increases exponentially. Accordingly, a high-performance computer is required, and calculation takes a long time. It commonly takes four to five hours or more for such calculation.

Hereinafter, a reciprocal distribution calculating method according to the inventive concept which is efficient compared to the reciprocal distribution calculating method according to the conventional art will be described.

According to a structure of the distribution matrix based on the distribution standard described as an example above, the distribution matrix is in the form of a rectangular matrix consisting of probability vectors, for which a sum of respective column elements thereof is 1. Although calculation of reciprocal distribution is not relevant to calculation of probabilities, due to characteristics of reciprocal distribution, when the reciprocal distribution calculation is expressed by a distribution matrix, the reciprocal distribution has the same form as a state-transition matrix as a result. As a result, Equation 1 is in the form of a state equation where a transition of changes between variables is expressed by a probability. A matrix A as above has the characteristics of converging when its power is doubled repeatedly, due to recursive characteristics of the state-transition matrix. While the recursive characteristics of the state-transition matrix are a well-known concept in the field related to probability, the concept has not been applied to reciprocal distribution yet. Many programs having a function of calculating costs according to a reciprocal distribution method never used the concept of a state-transition matrix for the last several tens of years. In other words, a method to effectively calculate reciprocal distribution costs has long been an unsolved problem in the field of cost accounting according to reciprocal distribution.

According to the inventive concept, the characteristic of the state-transition matrix is used to calculate reciprocal distribution costs by using a method different from the conventional art. That is, instead of performing calculation where a distribution process is repeated until the costs of the subsidiary departments converge to 0 as in the conventional art above, an operation of doubling the power of a distribution matrix is repeated until all elements expressing a distribution relation between subsidiary departments converge to 0 (step (c); S300). That is, a process in which $A^2$ is calculated, and then $A^4$ is calculated using $A^2$, and then $A^8$ is calculated using $A^4$ again is performed. When the power of distribution matrix is repeatedly doubled inductively until the distribution matrix converges, all elements expressing a distribution relation between the subsidiary departments converge to 0, and only elements expressing a distribution relation about production departments remain.

Elements of a distribution matrix are elements of a probability vector, and thus, absolute values of the elements are equal to or less than 1. Compared to the conventional reciprocal distribution calculating method, repeating of doubling the power of a distribution matrix involves a less amount of calculation and is simple, and the distribution matrix converges faster.

The calculation of doubling the power of the distribution matrix is performed by using the distribution matrix operation module 300. The distribution matrix operation module 300 calculates power doubled distribution matrix by using a computer processing unit (CPU) of a computer.

To set a standard for determining whether elements of a distribution matrix representing a distribution relation between subsidiary departments converge to 0, a convergence standard is used. The convergence standard is received from a user via a convergence standard input module 500 (step (e)). Here, a convergence standard which may be regarded substantially as 0 may be received from a user via an input device such as a computer keyboard, or a preset convergence standard may be read from a memory device.

According to the present exemplary embodiment, a convergence standard is set to 0.00001, and any value less than 0.00001 is determined to converge to 0. The convergence standard may vary according to circumstances.

A convergence determining module 600 determines whether all elements representing the distribution relation between the subsidiary departments have a value less than the convergence standard in step S400. The distribution matrix operation module 300 repeats calculating power doubled distribution matrix until the convergence determining module 600 determines that the elements converge.

As a result of repeating doubling the power of the distribution matrix until an element of the distribution matrix indicating reciprocal distribution between the subsidiary departments has a value less than 0.00001, elements of $A^{32}$ corresponding to the distribution matrix the power of which is five times doubled are as shown in Table 1 below. Values of rows and columns of $A^{32}$ are shown by rows and columns of Table 1 below for convenience.

TABLE 1

|     | s1    | s2    | s3    | a1    | a2    |
|-----|-------|-------|-------|-------|-------|
| s1  | 0.000 | 0.000 | 0.000 | 0.000 | 0.000 |
| s2  | 0.000 | 0.000 | 0.000 | 0.000 | 0.000 |
| s3  | 0.000 | 0.000 | 0.000 | 0.000 | 0.000 |
| a1  | 0.409 | 0.346 | 0.351 | 1.000 | 0.000 |
| a2  | 0.591 | 0.654 | 0.649 | 0.000 | 1.000 |

Step (c) was performed on various distribution matrices regarding other various examples, and it was found that in most cases, repeating of doubling the power seven times or less resulted in convergence of elements indicating reciprocal distribution between subsidiary departments, to 0. This means use of a state-transition matrix significantly reduces time for calculating reciprocal distribution costs.

Next, a distribution cost calculating module 400 calculates costs of respective cost departments distributed to the production departments by multiplying the distribution matrix converged in step (c) by a vector matrix having costs of the cost departments as elements (step (d); S500).

The costs of the subsidiary departments are multiplied by a distribution matrix ($A^{32}$) that converged in the form of a vector matrix as below (as described above, the matrix is described in the form of Table 2 below for convenience).

TABLE 2

| 200,000 | 0       | 0       |
|---------|---------|---------|
| 0       | 300,000 | 0       |
| 0       | 0       | 400,000 |
| 0       | 0       | 0       |
| 0       | 0       | 0       |

Amounts distributed to respective production departments obtained as a calculation result are as shown in the table below. The amounts of the costs of the subsidiary departments distributed to the production departments as shown here.

TABLE 3

|    | s1         | s2         | s3         |
|----|------------|------------|------------|
| s1 | 0.00       | 0.00       | 0.00       |
| s2 | 0.00       | 0.00       | 0.00       |
| s3 | 0.00       | 0.00       | 0.00       |
| a1 | 81,730.77  | 103,846.15 | 140,384.62 |
| a2 | 118,269.23 | 196,153.85 | 259,615.38 |

When values of row a1 and values of row a2 are respectively summed up, the amounts are respectively $325,961.54 and $574,038.46, which are the same as the distribution amounts calculated using the conventional method before.

When calculating reciprocal distribution costs of a real enterprise, the numbers of rows and columns of a distribution matrix each are often several hundred or more. For example, in the case of a distribution matrix consisting of 200 rows and 200 columns, doubling the power has to be repeated with respect to the distribution matrix having 40,000 elements. In general, all of 40,000 values are allocated to a computer memory to perform calculation. In order to effectively allocate a distribution matrix to a memory and calculate the distribution matrix the power of which is doubled, step (c) may also be processed in an order as follows.

Doubling the power of the distribution matrix may be calculated according to Equation 2 below.

$$a_{ij}^{2m} = \Sigma_{k=1}^{n} a_{ik}^{m} a_{kj}^{m} \quad \text{[Equation 2]}$$

$a_{ij}^{m}$: elements of row i, column j of $A^m$ $a_{ij}^{2}$: elements of row i, column j of $A^{2m}(=A^m \times A^m)$ In order to use the principle according to Equation 2 as described above, step (c) is performed in the following order. First, all elements of the distribution matrix are stored in an auxiliary storage 310 of the distribution matrix operation module 300.

In this state, all elements of row i of the distribution matrix are accessed from the auxiliary storage 310 and allocated to a main storage 320 (storage unit) of the distribution matrix operation module 300 (operation unit) (step (c-1)).

Next, all elements of column j of the distribution matrix are accessed from the auxiliary storage 310 and allocated to the main storage 320 (storage unit) of the distribution matrix operation module 300 (operation unit) (step (c-2)).

In this state, an operator 330 of the distribution matrix operation module 300 calculates the elements of row i, column j of the distribution matrix the power of which is doubled according to Equation 2 (step (c-3)). The operator 330 corresponding to a central processing unit (CPU) of a computer is directly connected to the main storage 320 to quickly access data and perform calculation.

By repeating the above process on each element, all elements of the power doubled distribution matrix may be sequentially calculated and the calculated values may be stored in the auxiliary storage 310. The auxiliary storage 310 sequentially transfers to the main storage 320 elements of each row and column of the distribution matrix needed for calculation of elements while entire data of the distribution matrix is stored in the auxiliary storage 310. The operator 330 directly accesses data from the main storage 320 to calculate elements of the distribution matrix the power of which is doubled.

According to the above-described method, a computer memory may be effectively used and a calculation speed may be improved.

Although an embodiment is described in which division-wise costs of subsidiary departments and production departments are calculated using a reciprocal distribution method, according to circumstances, costs may be calculated using a reciprocal distribution method by sorting activities of respective divisions as independent cost departments.

In this case, when receiving a distribution standard in step (a), a distribution standard is received for each activity, and in step (b), also, a distribution matrix is constructed based on activity-based costs.

The invention claimed is:

1. A computer-implemented reciprocal distribution calculating method for cost accounting, the computer-implemented reciprocal distribution calculating method comprising:
   (a) receiving, by a distribution standard input module, a distribution standard representing distribution ratios between cost departments consisting of subsidiary departments and production departments;
   (b) constructing, by a distribution matrix constructing module, a distribution matrix that may represent a distribution relation between the respective cost departments, by using Equation 1, based on the distribution standard;
   (c) repeating, by a distribution matrix operation module, doubling the power of the distribution matrix inductively until all elements of the distribution matrix representing a distribution relation between the subsidiary departments converges to be less than a received convergence standard, wherein the received convergence standard is very close to 0;
   (d) calculating, by a distribution cost calculating module, costs of the respective cost departments respectively distributed to the production departments by multiplying the distribution matrix converged in step (c) by a vector matrix having costs of the respective cost departments as elements; and
   (e) receiving the convergence standard for (c);
   wherein in step (c), when all elements of the distribution relation between the subsidiary departments are less than the received convergence standard as all elements of the distribution matrix representing the distribution relation are determined to converge to 0, wherein the Equation 1 and the Equation 2 are defined according to:

$$x[k+1] = Ax[k] \quad \text{[Equation 1]}$$

$x_i$: ith cost department n the number of cost departments $A = [a_{ij}]_{n \times n}$: ratio of a service of jth cost department, provided to the ith cost department $x[k]$: costs of cost departments redistributed by k times;

wherein step (c) comprises:
   (c-1) allocating all elements of row i of the distribution matrix to a storage unit of an operation unit;
   (c-2) allocating all elements of column j of the distribution matrix to the storage unit of the operation unit; and
   (c-3) calculating elements of row i, column j of the distribution matrix the power of which is doubled according to Equation 2, $$a_{ij}^{2m} = \sum_{k=1}^{n} a_{ik}^{m} a_{kj}^{m} \quad \text{[Equation 2]}$$

$a_{ij}^{m}$: elements of row $i$, column $j$ of $A^m$

-continued $a_{ij}^{2m}$: elements of row $i$, column $j$ of $A^{2m} (= A^m \times A^m)$.

2. The computer-implemented reciprocal distribution calculating method of claim 1, wherein in step (a), the distribution standard is received while separating respective activities of the subsidiary departments and the production departments and setting the respective activities as separate cost departments, and in step (b), the distribution matrix is constructed based on the activity-based costs of step (a).

3. The computer-implemented reciprocal distribution calculating method of claim 1, wherein in step (a), the distribution standard is received while separating respective activities of the subsidiary departments and the production departments and setting the respective activities as separate cost departments, and in step (b), the distribution matrix is constructed based on the activity-based costs of step (a).

* * * * *

UNITED STATES PATENT AND TRADEMARK OFFICE
CERTIFICATE OF CORRECTION

Page 1 of 1

PATENT NO. : 10,204,381 B2
APPLICATION NO. : 14/763165
DATED : February 12, 2019
INVENTOR(S) : Yun Han It is certified that error appears in the above-identified patent and that said Letters Patent is hereby corrected as shown below:

On the Title Page

Item (87) "PCT Pub. Date: Aug. 7, 2015" should be changed to -- PCT Pub. Date: Aug. 7, 2014 --.

Signed and Sealed this
Twenty-fifth Day of June, 2019

Andrei Iancu
*Director of the United States Patent and Trademark Office*